United States Patent
Syverson

[11] Patent Number: 5,952,926
[45] Date of Patent: Sep. 14, 1999

[54] PET DOORBELL APPARATUS

[76] Inventor: James M. Syverson, 213 Funk Ave., P.O. Box 1028, Lakefield, Minn. 56150

[21] Appl. No.: 08/863,943

[22] Filed: Apr. 2, 1997

Related U.S. Application Data

[63] Continuation-in-part of application No. 08/858,180, Feb. 20, 1996, abandoned, which is a continuation of application No. 08/390,364, Jan. 23, 1995, abandoned.

[51] Int. Cl.$^6$ .................................................. G08B 21/00
[52] U.S. Cl. ................................. 340/573.3; 340/286.11; 340/539; 119/174
[58] Field of Search .............................. 340/286.11, 330, 340/573.3, 539; 119/174

[56] References Cited

U.S. PATENT DOCUMENTS

| | | | |
|---|---|---|---|
| 4,323,883 | 4/1982 | Sowards | 340/573.3 |
| 4,400,696 | 8/1983 | Klingensmith | 340/573.3 |
| 4,551,713 | 11/1985 | Aossey | 340/573.3 |
| 4,686,504 | 8/1987 | German | 340/573.3 |
| 5,303,677 | 4/1994 | Jones | 340/573.3 |
| 5,365,214 | 11/1994 | Angott et al. | 340/328 |
| 5,475,369 | 12/1995 | Baker . | |
| 5,576,690 | 11/1996 | Waugh et al. | 340/539 |
| 5,604,478 | 2/1997 | Grady et al. | 340/539 |

Primary Examiner—Daniel J. Wu

[57] ABSTRACT

A new pet doorbell apparatus for providing a door bell system for pets to use to notify home occupants of their desire to enter or exit the house. The inventive device includes cover cap activator attached to the outside or inside of a home. The cover cap activator includes a base plate and a enclosing cover pivotally mounted to the base plate. The enclosing cover is movable from a first position to a second position when the enclosing cover is depressed by a pet desiring to enter a home. When the enclosing cover is depressed, a transmitter mounted to the base plate is activated by an activator extending from the enclosing cover. The transmitter sends a signal to a receiver so that speaker included in the receiver produces a sound to alert a person within the home to let the pet inside.

14 Claims, 3 Drawing Sheets

PET DOORBELL APPARATUS

CROSS REFERENCE TO RELATED APPLICATION

This application is a continuation-in-part of my prior utility patent application Ser. No. 08/858,180 filed Feb. 20, 1996 now abandoned, which is a continuation of my patent application Ser. No. 08/390,364 filed on Jan. 23, 1995 now abandoned.

BACKGROUND OF THE INVENTION

1. Field of the Invention

The present invention relates to pet notification systems and more particularly pertains to a new pet doorbell apparatus for providing a door bell system for pets to use to notify home occupants of their desire to enter or exit the house.

2. Description of the Prior Art

The use of pet notification systems is known in the prior art. More specifically, pet notification systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet notification systems include U.S. Pat. No. 5,303,677; U.S. Pat. No. 4,686,504; U.S. Pat. No. 4,551,713; U.S. Pat. No. 4,400696; and U.S. Pat. No. 4,323,883.

While these devices fulfill their respective, particular objectives and requirements, the aforementioned patents do not disclose a new pet doorbell apparatus. The inventive device includes cover cap activator attached to the outside of a home. The cover cap activator includes a base plate and a enclosing cover pivotally mounted to the base plate. The enclosing cover is movable from a first position to a second position when the enclosing cover is depressed by a pet desiring to enter a home. When the enclosing cover is depressed, a transmitter mounted to the base plate is activated by an activator extending from the enclosing cover. The transmitter sends a signal to a receiver so that speaker included in the receiver produces a sound to alert a person within the home to let the pet inside.

In these respects, the pet doorbell apparatus according to the present invention substantially departs from the conventional concepts and designs of the prior art, and in so doing provides an apparatus primarily developed for the purpose of providing a door bell system for pets to use to notify home occupants of their desire to enter the house.

SUMMARY OF THE INVENTION

In view of the foregoing disadvantages inherent in the known types of pet notification systems now present in the prior art, the present invention provides a new pet doorbell apparatus construction wherein the same can be utilized for providing a door bell system for pets to use to notify home occupants of their desire to enter the house.

The general purpose of the present invention, which will be described subsequently in greater detail, is to provide a new pet doorbell apparatus apparatus and method which has many of the advantages of the pet notification systems mentioned heretofore and many novel features that result in a new pet doorbell apparatus which is not anticipated, rendered obvious, suggested, or even implied by any of the prior art pet notification systems, either alone or in any combination thereof.

To attain this, the present invention generally comprises cover cap activator attached to the outside of a home. The cover cap activator includes a base plate and a enclosing cover pivotally mounted to the base plate. The enclosing cover is movable from a first position to a second position when the enclosing cover is depressed by a pet desiring to enter a home. When the enclosing cover is depressed, a transmitter mounted to the base plate is activated by an activator extending from the enclosing cover. The transmitter sends a signal to a receiver so that speaker included in the receiver produces a sound to alert a person within the home to let the pet inside.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new pet doorbell apparatus apparatus and method which has many of the advantages of the pet notification systems mentioned heretofore and many novel features that result in a new pet doorbell apparatus which is not anticipated, rendered obvious, suggested, or even implied by any of the prior art pet notification systems, either alone or in any combination thereof.

It is another object of the present invention to provide a new pet doorbell apparatus which may be easily and efficiently manufactured and marketed.

It is a further object of the present invention to provide a new pet doorbell apparatus which is of a durable and reliable construction.

An even further object of the present invention is to provide a new pet doorbell apparatus which is susceptible of a low cost of manufacture with regard to both materials and labor, and which accordingly is then susceptible of low prices of sale to the consuming public, thereby making such pet doorbell apparatus economically available to the buying public.

Still yet another object of the present invention is to provide a new pet doorbell apparatus which provides in the apparatuses and methods of the prior art some of the advantages thereof, while simultaneously overcoming some of the disadvantages normally associated therewith.

Still another object of the present invention is to provide a new pet doorbell apparatus for providing a door bell system for pets to use to notify home occupants of their desire to enter the house.

Yet another object of the present invention is to provide a new pet doorbell apparatus which includes cover cap activator attached to the outside of a home. The cover cap activator includes a base plate and a enclosing cover pivotally mounted to the base plate. The enclosing cover is movable from a first position to a second position when the enclosing cover is depressed by a pet desiring to enter a home. When the enclosing cover is depressed, a transmitter mounted to the base plate is activated by an activator extending from the enclosing cover. The transmitter sends a signal to a receiver so that speaker included in the receiver produces a sound to alert a person within the home to let the pet inside.

Still yet another object of the present invention is to provide a new pet doorbell apparatus that allows a pet to alert a person to the pet's presence.

Even still another object of the present invention is to provide a new pet doorbell apparatus that allows a pet that is outside a building to alert a person inside the building to let the pet inside.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
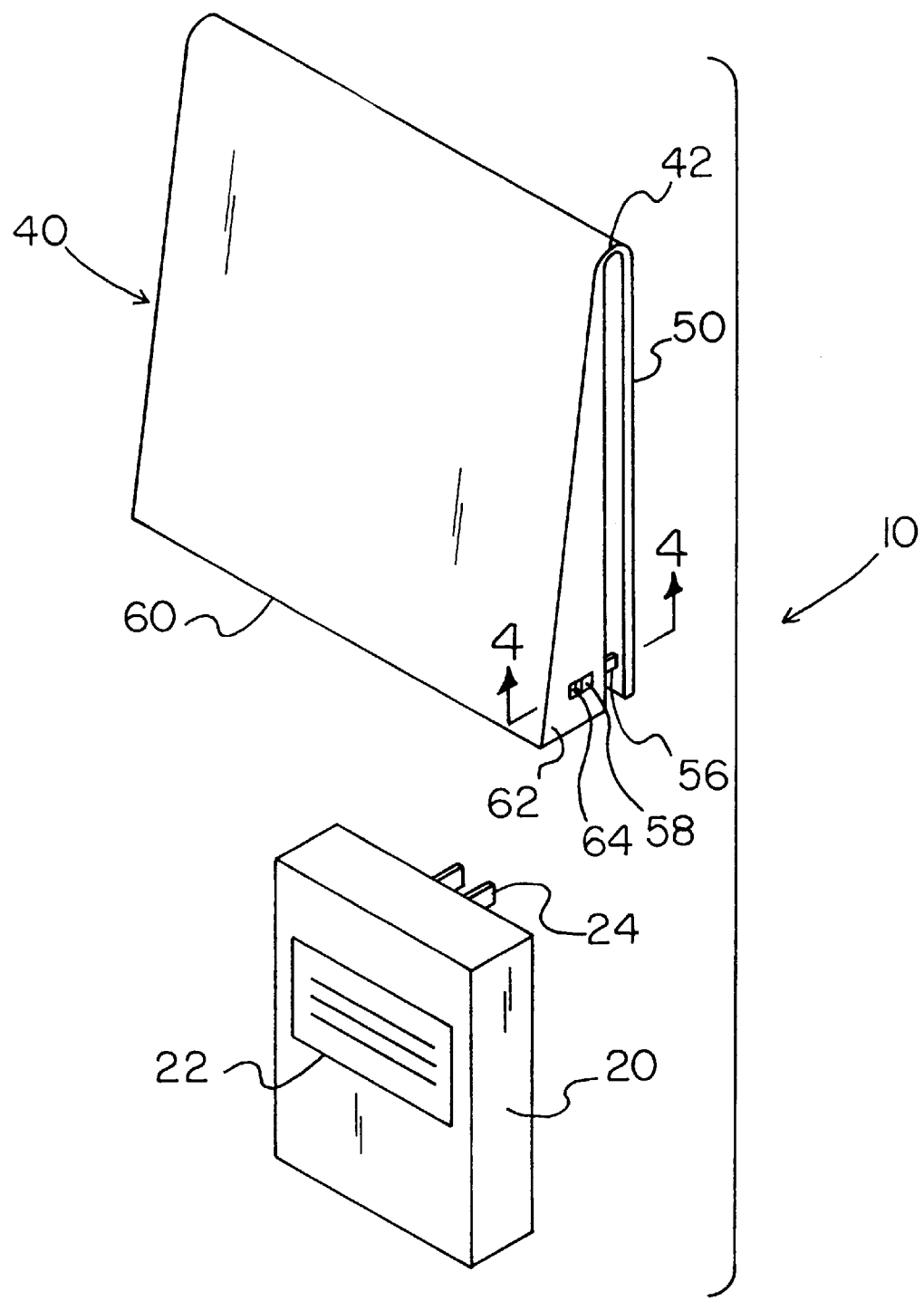
FIG. 1 is a perspective side view of a new pet doorbell apparatus according to the present invention.

With reference now to the drawings, and in particular to FIGS. 1 through 4 thereof, a new pet doorbell apparatus embodying the principles and concepts of the present invention and generally designated by the reference numeral 10 will be described.

As best illustrated in FIGS. 1 through 4, the pet doorbell apparatus 10 generally comprises receiver 20, a transmitter 30, and a cover cap activator 40.

Figure 2:
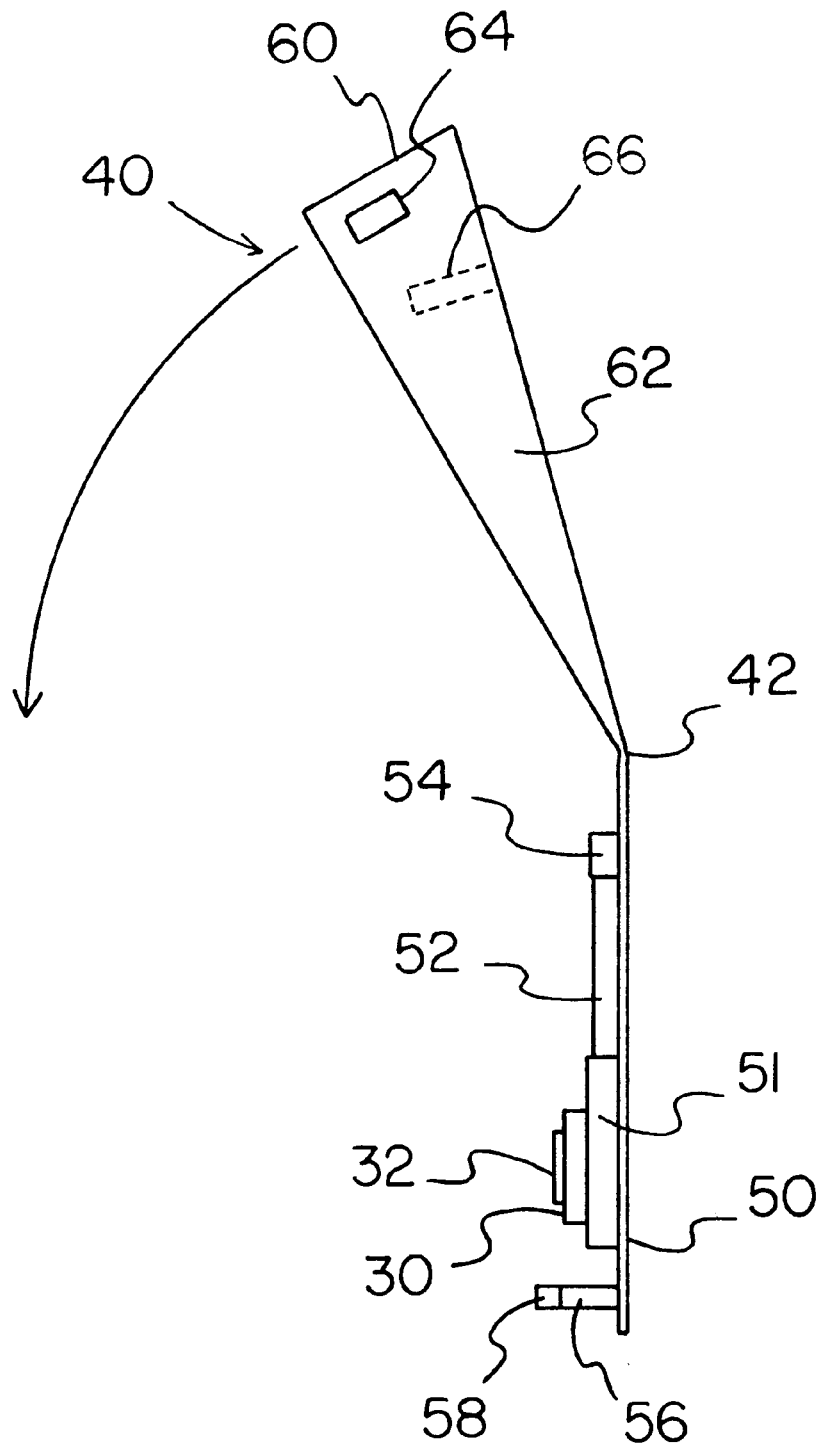
FIG. 2 is a side view of the present invention showing the enclosing cover member in an open position in relation to the base plate.

Generally, the cover cap activator 40 includes a base plate 50 and an enclosing cover 60. The enclosing cover 60 is pivotally mounted to the base plate 50 so that the enclosing cover 60 is movable from an open position to a closed position as shown in FIG. 2. This provides a user access to the interior of the cover cap activator 40. More preferably, the enclosing cover 60 is pivotally mounted to the base plate 50 by a living hinge 42 formed from the cover cap activator 40 to improve its weather resistant properties.

Figure 3:
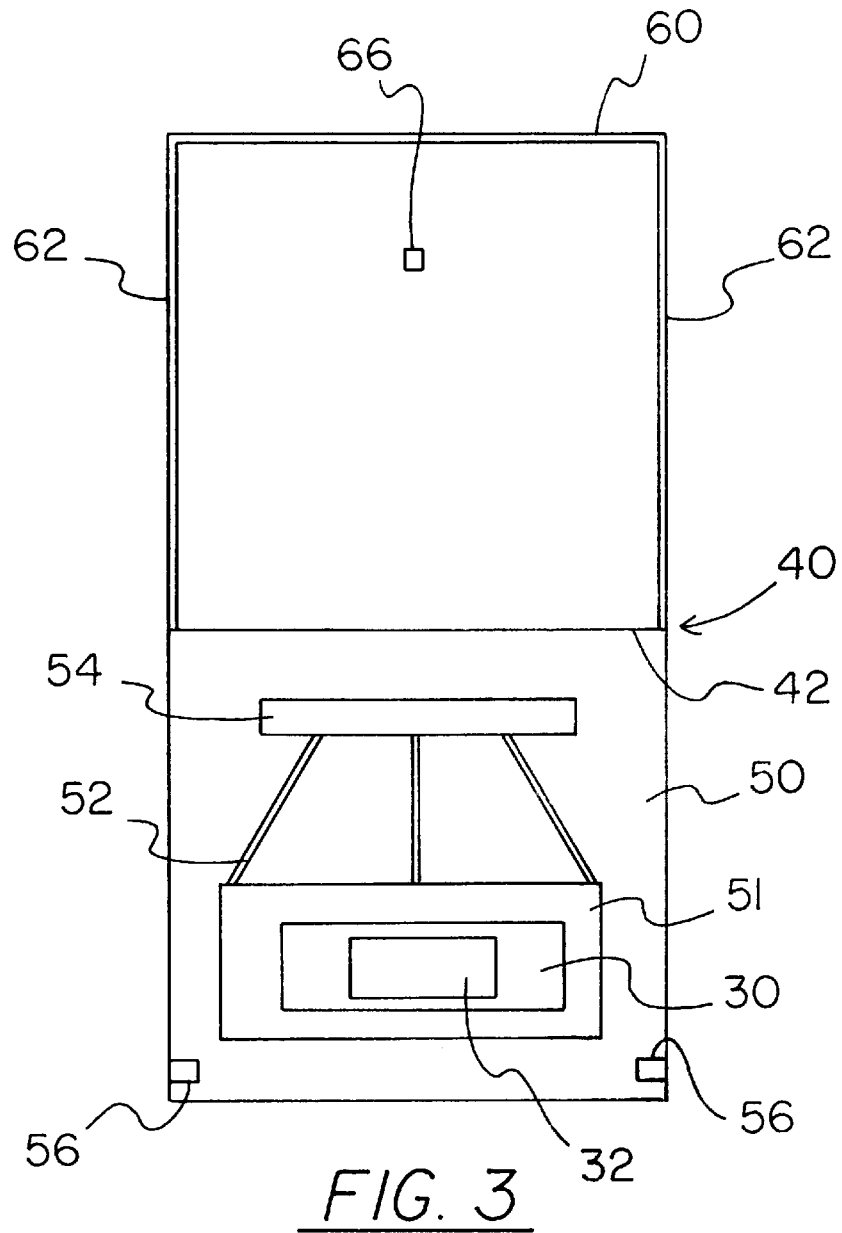
FIG. 3 is a top plan view of the present invention showing the enclosing cover member in an open position in relation to the base plate.
Figure 4:
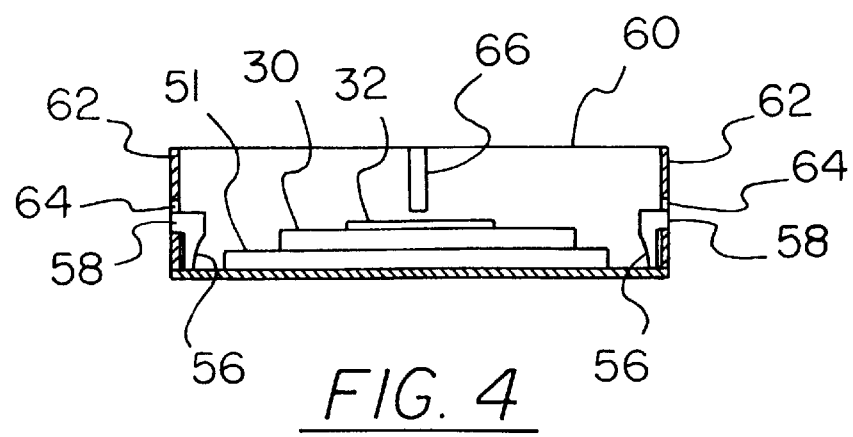
FIG. 4 is a cross-sectional view of the present invention taken along line 4—4 of FIG. 1.

Ideally, as shown in FIG. 3, the cover cap activator 40 is manufactured in a single piece so that it includes a base plate portion 50 and an enclosing cover portion 60. In this ideal embodiment, the enclosing cover portion 60 is folded along the living hinge 42 formed on the cover cap activator 40 between the enclosing cover portion 60 and the base plate portion 50 so that the enclosing cover portion may be positioned in a closed position adjacent the base plate portion 50. The living hinge 42 permits the enclosing cover portion 60 to be pivotable in relation to the base plate portion 50.

When the enclosing cover portion 60 is in a the closed position over the base plate portion 50, the enclosing cover portion 60 is movable by pressing on the enclosing cover 60 from a first position or resting position towards a second position or depressed position. Preferably, the enclosing cover portion 60 is designed to be depressable by a pet when in use.

Ideally, the enclosing cover portion 60 is shaped so that its outer surface slopes downwardly and outwardly in relation to the base plate portion 50. This shape permits depression of the enclosing cover portion 60 from the natural downward swiping motion of a pet's limb such as a dog scratching on a door to be let inside.

Also preferably, the cover cap activator 40 is constructed out of a durable weather resistant material such as plastic. This helps ensure that the enclosing cover portion 60 is sufficiently strong enough to sustain pressure when depressed by a pet. It also helps protect the interior of the cover cap activator 40 from the weather.

The base plate 50 includes three resilient ridges 52 extending along its surface. The resilient ridges 52 help keep the base plate substantially rigid when the enclosing cover 60 is depressed by a pet.

Also extending from the surface the base plate 50 is a biasing member 54. The biasing member 54 is extended a sufficient distance from the base plate 50 so that it biases the enclosing cover towards the first position.

On each of the side walls 62 of the enclosing cover 60, is a cover notch 64. A pair of correspondingly aligned stop tabs 56 extend from the base plate 50. The stop tabs 56 function as stop means to position the enclosing cover at the first position. Each stop tab has a flange 58 at its end that extends towards the corresponding edge of the base plate 50. Each flange 58 is inserted into its corresponding cover notch 64. Because of the biasing pressure from the biasing member 54 the flanges 58 within the cover notches 64 positions the enclosing cover 60 at the first position. The cover notches 64 are of sufficient length to permit movement of the enclosing cover 60 towards the second or depressed position when the enclosing cover 60 is depressed by a pet.

The transmitter 30 is attached to a transmitter mount 51 included on the base plate 50 so that the transmitter 30 is protected from the weather when the cover cap activator 40 is in the closed position. The transmitter 30 functions as a transmitter means for transmitting a signal to the receiver 20. The transmitter 30 also includes a transmission activator 32.

When the transmission activator 32 is depressed or engaged, it activates the transmitter 30 to send a signal to the receiver 20.

An activator 66 extends from the enclosing cover 60 so that it extends towards the transmitter when the cover cap activator 40 is in the closed position. When the enclosing cover 60 is depressed towards the second position, the transmission activator 32 depressed the transmission activator 30 so that the transmitter 30 is activated to send a signal to the receiver 20.

The receiver 30 functions as a receiver means to receive the signal transmitted from the transmitter 30. The receiver 30 also includes a speaker device 22 that generates a sound when the receiver 30 receives a signal from the activated transmitter 30.

In use, the cover cap activator 40 is attached to the outside of a building or wall at a height that is accessible to a pet such as a dog. The receiver 20 is inserted by its electric prongs 24 into an electrical outlet within the building to provide power source for the receiver and the speaker 22. When the pet wants to come inside the building, the pet depresses the enclosing cover 60 towards the second position. This causes the activator 66 to depress the transmission activator 32 thereby activating the transmitter 30 to send a signal. The receiver 20 receives this transmitted signal which in turn causes the speaker device 22 to produce a sound to alert a person inside the building to let the pet inside.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet doorbell apparatus, comprising:
   a transmitter means for wirelessly transmitting a signal when activated;
   a cover cap activator being depressable by a pet for activating said transmitter means, whereby said transmitter means is activated when said cover cap activator is depressed by a pet, said transmitter means being protected by said cover cap activator in a weather resistant manner;
   a receiver means for wirelessly receiving a signal transmitted from said transmitter means; and
   a sound generating device being operationally connected to said receiver means, said sound generating device producing a sound when said receiver means receives a signal from said transmitter means.

2. The pet doorbell apparatus of claim 1, wherein said transmitter means is provided within said cover cap activator.

3. The pet doorbell apparatus of claim 1, wherein said cover cap activator comprises a base plate, an enclosing cover being pivotally mounted to said base plate, said enclosing cover being biased towards a first position, said enclosing cover being movable from said first position towards a second position when depressed by a pet, whereby said transmitter means is activated when said enclosing cover is moved towards said second position by a pet depressing said enclosing cover.

4. The pet doorbell apparatus of claim 3, wherein said base plate has a biasing member, said biasing member biasing said enclosing cover towards said first position.

5. The pet doorbell apparatus of claim 3, wherein said enclosing cover has an activator, whereby said activator activating said transmitter means when said enclosing cover is depressed towards said second position.

6. The pet doorbell apparatus of claim 5, wherein said transmitter means includes a transmission activator, whereby said transmitter means transmits a signal when said transmission activator is engaged, said transmission activator being engaged by said enclosing cover activator when said enclosing cover is depressed towards said second position.

7. The pet doorbell apparatus of claim 3, wherein said transmitter means is mounted on said base plate.

8. The pet doorbell apparatus of claim 3, wherein said base plate includes at least one stop means, said enclosing cover being positioned by said stop means at said first position, said stop means permitting movement of said enclosing cover towards said second position.

9. The pet doorbell apparatus of claim 8, wherein said enclosing cover includes at least one side wall, said side wall having a cover notch, said stop means being inserted into said cover notch whereby said enclosing cover is positioned by said stop means at said first position, said stop means being positionable within said cover notch to permit movement of said enclosing cover towards said second position.

10. The pet doorbell apparatus of claim 3, wherein said base plate includes at least one resilient ridge being extended along its surface to help keep said base plate substantially rigid when said enclosing cover is depressed.

11. The pet doorbell apparatus of claim 3, wherein said enclosing cover is pivotally mounted to said base plate by a living hinge, said living hinge for helping protect said transmitter means in a weather resistant manner.

12. The pet doorbell apparatus of claim 1, wherein said cover cap activator includes a base plate portion and an enclosing cover portion, said enclosing cover portion being folded along a living hinge so that said enclosing cover portion is adjacent said base plate portion, said enclosing cover portion being pivotable in relation to said base plate portion, said enclosing cover portion being biased towards a first position, said enclosing cover portion being movable from said first position towards a second position when depressed by a pet, whereby said transmitter means is activated when said enclosing cover portion is moved towards said second position by a pet depressing said enclosing cover.

13. A pet doorbell apparatus, comprising:
    a transmitter means for wirelessly transmitting a signal when activated;
    a transmission activator being included on said transmitter means whereby said transmitter means transmits a signal when said transmission activator is engaged;
    a receiver means for wirelessly receiving a signal transmitted from said transmitter means;
    a sound generating device being operationally connected to said receiver means whereby said sound generating device produces a sound when said receiver means receives a signal from said transmitter means;

a cover cap activator comprising a base plate and an enclosing cover, said transmitter means being mounted on said base plate, said transmitter means being protected by said cover cap activator in a weather resistant manner, said enclosing cover having at least one side wall, said enclosing cover being pivotally mounted to said base plate, said enclosing cover being movable from said first position towards a second position when depressed by a pet;

a biasing member being extended from said base plate, said biasing member biasing said enclosing cover towards said first position;

a cover notch being provided on said enclosing cover side wall;

at least one stop means being extended from said base plate, said stop means being inserted into said cover notch whereby said enclosing cover is positioned by said stop means at said first position, said stop means being positionable within said cover notch to permit movement of said enclosing cover towards said second position;

an activator being extended from said enclosing cover whereby said transmission activator is engaged by said enclosing cover activator when said enclosing cover is depressed towards said second position; and at least one resilient ridge being extended along said base plate surface for helping keep said base plate substantially rigid when said enclosing cover is depressed.

14. The pet doorbell apparatus of claim 13, wherein said cover cap activator includes a base plate portion and an enclosing cover portion, said enclosing cover portion being folded along a living hinge so that said enclosing cover portion is adjacent said base plate portion, said enclosing cover portion being pivotable in relation to said base plate portion, said enclosing cover portion being biased towards a first position, said enclosing cover portion being movable from said first position towards a second position when depressed by a pet, whereby said transmitter means is activated when said enclosing cover portion is moved towards said second position by a pet depressing said enclosing cover.

* * * * *